March 11, 1952     V. P. DI RENZO     2,588,618
EGG STORAGE AND DISPENSING DEVICE
Filed March 24, 1948     2 SHEETS—SHEET 1
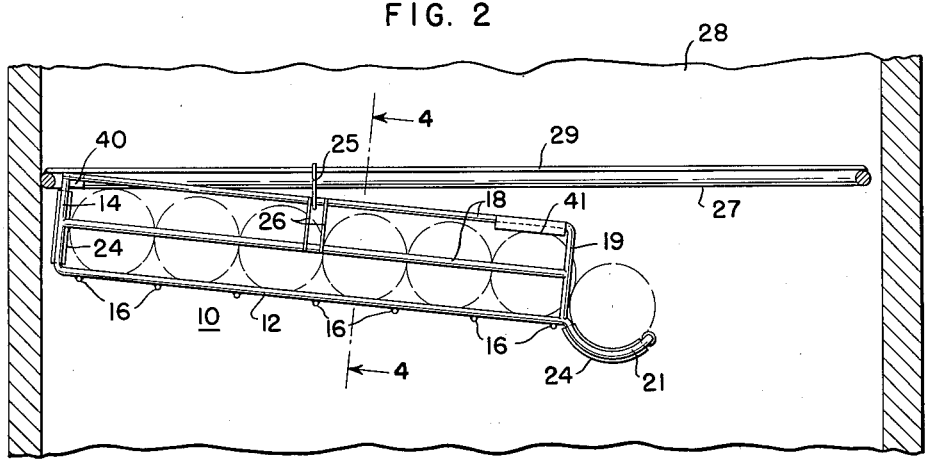
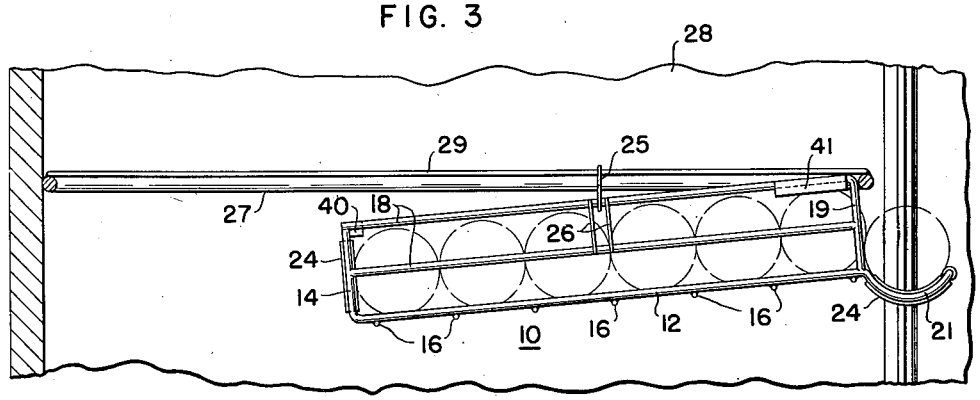
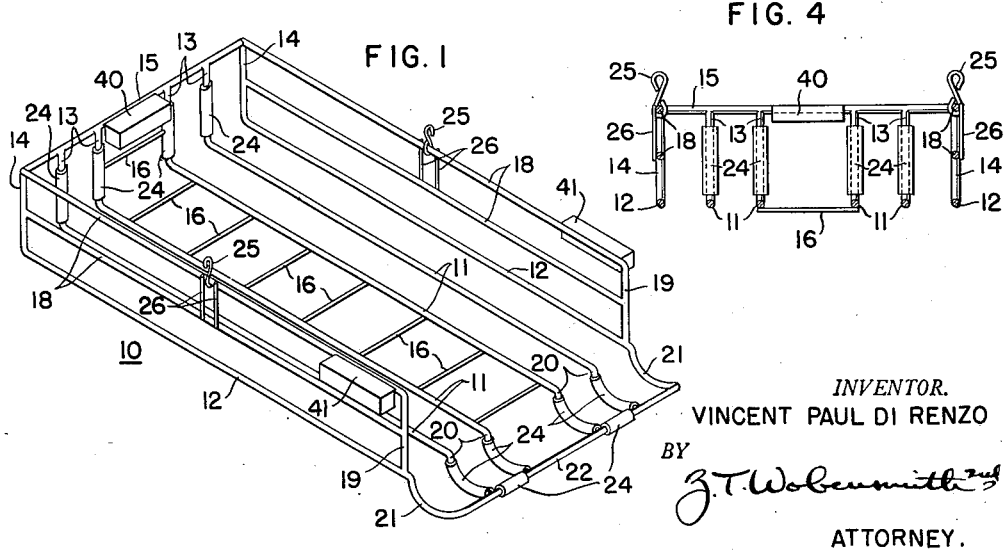
*INVENTOR.*
VINCENT PAUL DI RENZO
BY
ATTORNEY.

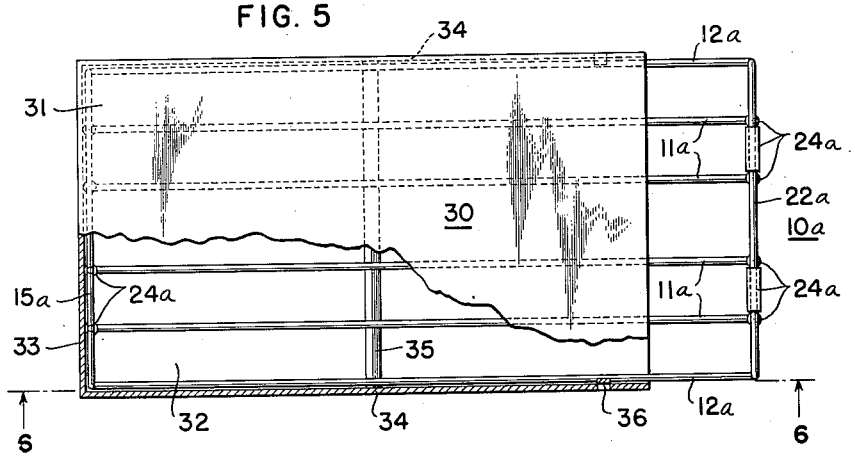
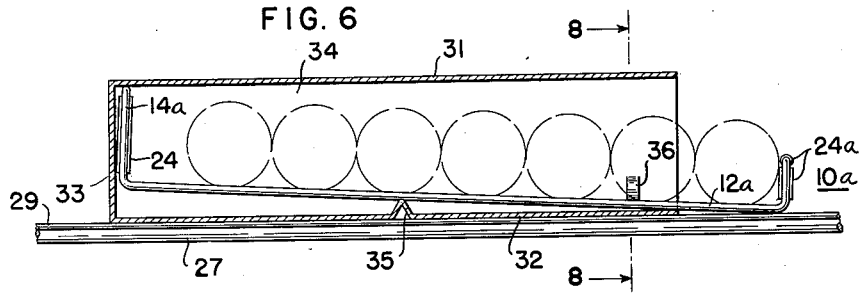
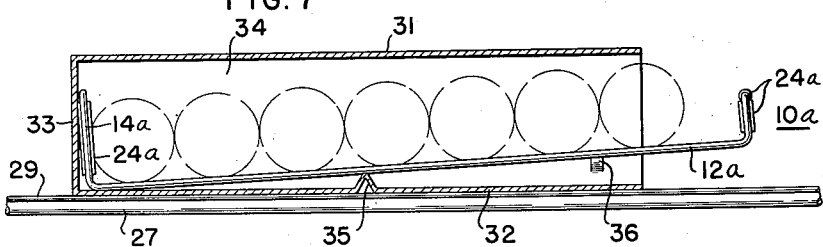
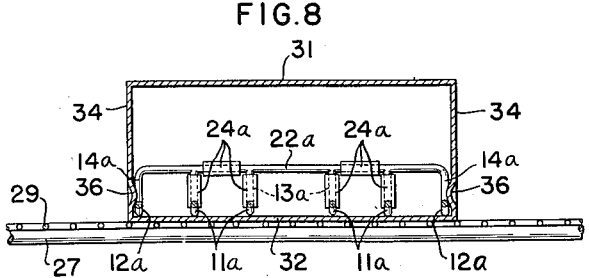
INVENTOR.
VINCENT PAUL DI RENZO
ATTORNEY.

Patented Mar. 11, 1952

2,588,618

UNITED STATES PATENT OFFICE 2,588,618

EGG STORAGE AND DISPENSING DEVICE

Vincent P. Di Renzo, Landisville, N. J., assignor of one-half to Simon Di Renzo and one-half to John J. McDevitt, both of Philadelphia, Pa.

Application March 24, 1948, Serial No. 16,841

2 Claims. (Cl. 312—49)

This invention relates to egg storage and dispensing devices and more particularly to such devices which are adapted for use in refrigerators now available.

Various provisions have heretofore been suggested for the storage of eggs in refrigerators but none of these have proven wholly satisfactory. In some instances the eggs are not kept readily accessible. In other instances the installation is difficult or the structure is unnecessarily complicated.

It is the principal object of the present invention to provide an egg storage and dispensing device which may be mounted in or placed in the storage compartment of a refrigerator for easy access for filling or for removal of the eggs and which will occupy a minimum amount of space.

It is a further object of the present invention to provide an egg storage and dispensing device for refrigerators which, after it is placed in the refrigerator may be filled and emptied as desired without removal of the same.

It is a further object of the present invention to provide a device of the character aforesaid in which the hazard of breakage of the eggs is reduced to a minimum.

It is a further object of the present invention to provide an egg storage and dispensing device having a tiltable tray portion movable to one position for the insertion of eggs and movable to another position for making the eggs available for use.

It is a further object of the present invention to provide an egg storage and dispensing device which in one form thereof may be readily attached to the shelf in the refrigerator storage space of a domestic refrigerator.

It is a further object of the present invention to provide an egg storage and dispensing device which in another form may be readily positioned upon a shelf in the refrigerator storage space of a domestic refrigerator, and upon which additional objects to be kept in cool or refrigerated condition may be placed.

Other objects and advantageous features of the invention will be apparent from the specification and claims.

The nature and characteristic features of the invention will be more readily understood from the following description, taken in connection with the accompanying drawings forming part hereof, in which:

Figure 1 is a view in perspective of a preferred embodiment of an egg storage and dispensing device in accordance with the present invention;

Fig. 2 is a side elevational view of the same mounted in one position in a refrigerator and in position for dispensing;

Fig. 3 is a view similar to Fig. 2 showing the same in another position in a refrigerator and tilted for filling;

Fig. 4 is a transverse sectional view taken approximately on the line 4—4 of Fig. 2;

Fig. 5 is a top plan view of another form of egg storage and dispensing device in accordance with the present invention, parts being broken out to show the details of construction;

Fig. 6 is a vertical sectional view taken approximately on the line 6—6 of Fig. 5 and showing the rack or tray in the position for dispensing;

Fig. 7 is a view similar to Fig. 6 and showing the rack or tray in position for insertion of eggs to be stored; and Fig. 8 is a transverse sectional view taken approximately on the line 8—8 of Fig. 6.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to Figs. 1 to 4 of the drawings, the egg storage and dispensing device therein illustrated includes a rack or tray 10 preferably made of wire or any other desired material. The rack or tray 10 preferably has a bottom wall or floor formed of parallel longitudinally extending bars or strips of wire 11 and 12.

The strips of wire 11 are preferably spaced to provide pairs of rails for the support of the eggs placed therein with their longer axes transversely disposed. The strips 11 support the eggs and permit forward or rearward rolling of the eggs upon tilting of the rack or tray 10.

The strips 11 and 12, at their rear ends are preferably bent upwardly as at 13 and 14 to provide a rear wall for the rack or tray 10 and the portions 13 and 14 are connected at their upper ends to a transverse bar 15. The innermost strips 12 may be connected, if desired, by suitable braces 16 for stiffening.

The rack or tray 10 is also provided with side walls preferably formed of parallel longitudinally extending strips of wire 18 disposed above the strips 12 and connected at their front ends to upstanding bars 19 and at their rear ends to the upwardly extending portions 14.

The strips 11 and 12 have forward extensions 20 and 21 concaved or arcuate and disposed below the level of the floor of the rack or tray 10 to provide a trough for the reception of and access to eggs to be withdrawn by the user. The front ends of the extensions 20 and 21 are connected to a cross bar 22. The upturned portions 13 of the strips 11 and the curved or arcuate extensions 20' of the strips 20, as well as the front bar 22 between the respective pairs of strips 11 may be provided with coverings 24 of resilient material, such as rubber, for cushioning the eggs.

The upper side strips 18 are preferably provided with S-shaped mounting hooks 25 which are rearwardly disposed with respect to the center of gravity of the rack 10 so that the rack 10 normally, and whether filled or empty, tends to incline downwardly and forwardly. The hooks 25 may be prevented from undesired sliding movement along the upper side strips 18 by limit stops 26 of wire which are connected to the upper side strips 18 and to side strips 18 therebelow and also distribute the weight between the vertically spaced side strips.

As illustrated in Fig. 2, the supporting hooks 25 permit of mounting of the rack 10 beneath a shelf 27 of a refrigerator 28 for engagement by the hooks 25 with the forwardly extending rails 29 of the shelf 27. The preferred angle of inclination of the rack 10, when in the position indicated in Fig. 2 is such that the egg supporting rails 11 have a slope of approximately one-half inch to the foot, which permits of the rolling of the eggs forwardly without likelihood of undesired discharge and the maintenance of eggs, so long as any eggs are available in the rack 10, at the trough. The hooks 25 also permit of the upward tilting or swinging of the rack 10 to the position indicated in Fig. 3 for filling and so that upon the placing of an egg on the rails or strips 11, the same will roll to the back of the rack 10 without danger of breaking upon impact with the rear wall or upon contact of the eggs with each other. If desired, however, the rack 10 may be slid forwardly by sliding the hooks 25 frontwardly along the rails 29 of the shelf 27 to the position indicated in Fig. 3 and after filling, moved rearwardly to the position indicated in Fig. 2, and permitted to tilt downwardly to the position shown in Fig. 1.

If it is desired to hold the rack or tray 10 in either inclined position, the rear bar 15 and the front portions of the side strips 18 may respectively have small permanent magnets 40 and 41 of high intensity magnetic material secured thereto. Upon swinging of the rack or tray 10 to either tilted position the magnet or magnets thus brought into contact with the shelf 27 will tend to hold the rack or tray 10 in the position to which it has been moved until released by the user.

Referring now more particularly to Figs. 5 to 8, inclusive, the egg storage and dispensing device there shown preferably includes a rack or tray 10a of wire or similar material having a floor or bottom wall consisting of spaced bottom strips or rails 11a for the reception of the eggs, and bottom side strips 12a. The rails 11a and the strips 12a at the front ends thereof extending upwardly, and are connected to a front cross bar 22a.

The rails 11a and the strips 12a at the rear ends thereof extend upwardly as at 13a and 14a and are connected to a rear transversely extending bar 15a which is preferably disposed at a higher elevation than the front bar 22a.

The upwardly extending front and rear ends of the rails 11a and the strips 12a and the front and rear cross bars 22a and 15a between the pairs of rails 11a, may be provided with suitable elastic coverings 24a of resilient material, such as rubber, or the like.

The rack or tray 10a is adapted to be positioned within a box 30, preferably of sheet metal, having a horizontal top wall 31, a horizontal bottom wall 32, a vertical rear wall 33, and vertical side walls 34. The box 30 is provided with a pivotal support for the rack 10a and for this purpose, if the bottom wall 32 is made of sheet material, may comprise a fulcrum consisting of a stuck-up inverted V-shaped portion 35 for engagement by the lower sides of the rails 11a and the strips 12a. The portion 35 is preferably located to the rear of the center of gravity of the rack or tray 10a so that the rack or tray 10a normally has the bottom wall thereof tilted with the front lower than the rear.

In order to positively position the rack or tray 10a the side walls 34 may be provided with struck-in portions 36 for frictional engagement by and with the outer strips 12a for holding the rack 10a at the desired position.

As illustrated in Fig. 6, the rack or tray 10a is tilted to the position for dispensing and the rear bar 15a, in engagement with the interior of the top wall 31, acts as a stop, and the struck-in portions 36 by their engagement with the strips 12a hold the rack or tray 10a in a downwardly tilted position. If it is desired to tilt the rack or tray 10a upwardly for filling (as shown in Fig. 7), the rack or tray 10a is swung upwardly with respect to the struck-in portions 36 and will remain in that position for filling and until the rack or tray 10a is moved downwardly by the user past the struck-in portions 36 where it is held in position.

The storage and dispensing device as illustrated in Figs. 5 to 8, inclusive, is adapted to be placed upon a refrigerator shelf 27 although the same could be secured in position therebelow if desired. The top face of the top wall 31 may itself be used as a shelf on which to place other articles for storage in the refrigerator.

It will be noted that the egg storage and dispensing device, in both forms, occupies a relatively small space within the refrigerator as compared with the articles to be stored and does not interfere in any way with the normal use of the refrigerator.

I claim:

1. An egg storage and dispensing device for refrigerators comprising a box adapted to rest upon a refrigerator shelf, a tray in said box having a rear end wall portion, a front end portion at which the eggs are accessible and a bottom portion for supporting the eggs and supporting means for tiltably mounting said tray in said box comprising fulcrum members in a lower portion of the box and with which the bottom portion of said tray is in engagement, said fulcrum members being disposed intermediate the ends of the tray and offset from the center of gravity whereby the tray is normally inclined downwardly towards the front for dispensing and is capable of being inclined downwardly towards the rear for filling.

2. An egg storage and dispensing device for refrigerators comprising a box adapted to rest upon a refrigerator shelf, a tray in said box having a rear end wall portion, a front end portion at which the eggs are accessible and a bottom portion for supporting the eggs, supporting means for tiltably mounting said tray comprising pivotal supporting members intermediate the ends of the tray and offset from the center of gravity of the tray whereby the tray is normally inclined downwardly towards the front for dispensing and is capable of being inclined downwardly towards the rear for filling, and holding means carried by said box for engagement with said tray for maintaining said tray in at least one of the tilted positions.

VINCENT P. DI RENZO.

REFERENCES CITED

The following references are of record in the file of this patent:

UNITED STATES PATENTS

| Number | Name | Date |
|---|---|---|
| 246,435 | Whitney | Aug. 30, 1881 |
| 1,997,220 | Killgore | Apr. 9, 1935 |
| 2,036,115 | Branch | Mar. 31, 1936 |
| 2,138,418 | Fahrne | Nov. 29, 1938 |
| 2,147,861 | Shopen | Feb. 21, 1939 |
| 2,149,821 | Sutherland | Mar. 7, 1939 |
| 2,239,369 | Nauert | Apr. 22, 1941 |